US007822860B2

(12) United States Patent
Brown et al.

(10) Patent No.: US 7,822,860 B2
(45) Date of Patent: Oct. 26, 2010

(54) METHOD AND APPARATUS FOR DYNAMIC RECONFIGURATION OF WEB SERVICES INFRASTRUCTURE

(75) Inventors: Kyle G. Brown, Apex, NC (US); Stephen Glen Graham, Chapel Hill, NC (US); Steven M. Miller, Apex, NC (US); Mark Douglas Weitzel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 10/014,106

(22) Filed: Dec. 11, 2001

(65) Prior Publication Data
US 2003/0110242 A1 Jun. 12, 2003

(51) Int. Cl.
*G06F 15/16* (2006.01)
(52) U.S. Cl. .................. 709/228; 709/219; 709/223; 707/609
(58) Field of Classification Search ......... 709/217–221, 709/223, 225–226, 228; 707/609, 626, 638–639, 707/655
See application file for complete search history.

(56) References Cited

U.S. PATENT DOCUMENTS

| 6,148,335 | A  |    | 11/2000 | Haggard et al. ............ 709/224 |
| 6,161,128 | A  |    | 12/2000 | Smyk ......................... 709/205 |
| 6,175,869 | B1 |    | 1/2001  | Ahuja et al. ................ 709/226 |
| 6,256,668 | B1 | *  | 7/2001  | Slivka et al. ............... 709/220 |
| 6,266,774 | B1 |    | 7/2001  | Sampath et al. ............. 713/201 |
| 6,279,001 | B1 |    | 8/2001  | DeBettencourt et al. ...... 707/10 |
| 6,289,377 | B1 |    | 9/2001  | Lalwaney et al. ........... 709/222 |
| 6,327,622 | B1 | *  | 12/2001 | Jindal et al. ................ 709/228 |
| 6,496,858 | B1 | *  | 12/2002 | Frailong et al. ............. 709/221 |
| 6,557,054 | B2 | *  | 4/2003  | Reisman ..................... 710/33 |
| 6,604,135 | B1 | *  | 8/2003  | Rogers et al. .............. 709/217 |

(Continued)

FOREIGN PATENT DOCUMENTS

EP            967545 A1    12/1999

(Continued)

OTHER PUBLICATIONS

Project JXTA. Collab.Net, Inc. Archived May 15, 2001. http://web.archive.org/web/20010515211442/http://www.jxta.org/.*

(Continued)

*Primary Examiner*—Vivek Srivastava
*Assistant Examiner*—Jeffrey R Swearingen
(74) *Attorney, Agent, or Firm*—A. Bruce Clay

(57) ABSTRACT

The invention provides a software construct, herein termed a Web service container, for managing Web services at a network node and an adaptive model for the dynamic configuration of a plurality of Web service containers distributed throughout a network, such as the Internet or an intranet, in a software and hardware platform-independent manner. Containers can communicate with each other via the network to determine contextual information such as the identity of each other, the capabilities of each other, the operating system or platforms of each others, the contents of the container (i.e., the available Web services at that location), etc. By providing a container framework and the ability to exchange contextual information, the present invention allows servers as well as clients to dynamically exchange Web services software as well as contextual information, such as current workload, so that servers and clients are virtually limitlessly reconfigurable based on context.

41 Claims, 11 Drawing Sheets

U.S. PATENT DOCUMENTS

| | | | | |
|---|---|---|---|---|
| 6,647,420 | B2* | 11/2003 | Hellbusch et al. | 709/226 |
| 6,691,176 | B1* | 2/2004 | Narin et al. | 719/318 |
| 6,745,224 | B1* | 6/2004 | D'Souza et al. | 709/202 |
| 6,757,262 | B1* | 6/2004 | Weisshaar et al. | 370/310 |
| 6,785,721 | B1* | 8/2004 | Immerman et al. | 709/220 |
| 6,910,068 | B2* | 6/2005 | Zintel et al. | 709/220 |
| 7,028,312 | B1* | 4/2006 | Merrick et al. | 709/219 |
| 7,072,982 | B2* | 7/2006 | Teodosiu et al. | 709/219 |
| 7,085,807 | B2* | 8/2006 | Simpson et al. | 709/224 |
| 7,159,007 | B2* | 1/2007 | Stawikowski | 709/223 |
| 7,165,113 | B2* | 1/2007 | Karp et al. | 709/230 |
| 2001/0042112 | A1* | 11/2001 | Slivka et al. | 709/220 |
| 2002/0111814 | A1* | 8/2002 | Barnett et al. | 705/1 |
| 2003/0093529 | A1* | 5/2003 | Simpson et al. | 709/226 |
| 2003/0097464 | A1* | 5/2003 | Martinez et al. | 709/218 |

FOREIGN PATENT DOCUMENTS

| | | |
|---|---|---|
| EP | 1049031 A2 | 11/2000 |
| JP | 11219391 A | 1/1998 |
| JP | 10105388 A | 4/1998 |
| WO | WO 00/77747 A1 | 5/2000 |
| WO | WO 01/15039 A1 | 3/2001 |

OTHER PUBLICATIONS

Januszewski, Karsten. "Web Service Description and Discovery Using UDDI, Part I". MSDN Online Library. http://msdn.microsoft.com/library/en-us/dnservice/html/service10032001.asp?frame=true Microsoft Corporation. Oct. 3, 2001.*

Christensen, Erik et al. Web Services Description Language (WSDL) 1.1. W3C Note Mar. 15, 2001. http://www.w3.org/TR/wsdl.*

Wolter, Roger. "XML Web Services Basics." MSDN Online Library. Microsoft Corporation. Dec. 2001. http://msdn.microsoft.com/webservices/webservices/understanding/webservicesbasics/.*

Sycara, Katia. "Multi-Agent Infrastructure, Agent Discovery, Middle Agents for Web Services and Interoperation", Multi-Agent Systems and Applications: 9th ECCAI Advanced Course ACAI 2001 and Agent Link's 3rd European Agent Systems Summer School, EASSS 2001, Prague, Czech Republic, Jul. 2-13, 2001. Springer Berlin, pp. 17-49.*

Chenyang Lu; TF Abdelzaber; JA Stankovic; SH Son, A Feedback Control Approach for Guaranteeing Relative Delays in Web Servers, Proceedings Seventh IEEE Real-Time Technology and Applications Symposium, Taipei, Taiwan, May 30-Jun. 1, 2001 Sponsored by : IEEE Comput. Soc. Tech, Committee on Real-Time Syst.

Abstract of G. Graef; M Gaedke, Construction of Adaptive Web-Applications form Reusable Components, Electronic Commerce and Web Technologies. First International Conference, EC-Web 2000. Proceedings (Lecture Notes in Computer Science vol. 1875), London, UK, Sep. 4-6, 2000.

Abstract of AC Lim; JN Milligan, Building Mission Critical Systems in Internet Time: a report form front lines, Information Strategy: The Executive's Journal, vol. 15, No. 3, pp. 13-17, Spring 1999.

Dynamic Internet Adaption based on a Measured Connection Speed, Article 133, p. 143, International Business Machines Research Disclosure, Jan. 2001.

Method for Generating Advertising Revenue, based on Real-Time Usage of a Web Service, Article 135, p. 1122, International Business Machines Research Disclosure, Jun. 2000.

* cited by examiner

METHOD AND APPARATUS FOR DYNAMIC RECONFIGURATION OF WEB SERVICES INFRASTRUCTURE

FIELD OF THE INVENTION

The invention pertains to the provision of computer network services, such as Web services provided via the Internet. More particularly, the invention pertains to the movement of Web services and their code via the network and the dynamic configuration of servers based on context.

BACKGROUND OF THE INVENTION

The Internet is a vast collection of computing resources, interconnected as a network, from sites around the world. It is used every day by millions of people. The World Wide Web (referred to herein as the "Web") is that portion of the Internet that uses the HyperText Transfer Protocol (HTTP) as a protocol for exchanging messages. Alternatively, the HTTPS protocol can be used, where this protocol is a security-enhanced version of HTTP.

The user working in a Web environment will have software running on his or her computer to allow him or her to create and send requests for information, and to see the results. These functions are typically combined in a software package that is referred to as a "Web browser", or "browser". After the user has created a request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server".

The HTTP communications protocol uses a request/response paradigm, where the electronic messages sent between communicating computers can be categorized as either requests for information or responses to those requests.

Content on the Internet typically is stored on server computers in individual files in the form of HTML pages. HTML (HyperText Markup Language) is a Web content formatting language specifically designed for a distributed network such as the Internet. An HTML page (or file) contains HTML code, which indicates how the information content is to be displayed as well as the actual content and/or references to other files where the content is contained. Web browser software is designed to issue page requests in the form of URLs (Universal Resource Locators). A URL essentially is an address of a file that is accessible through the Internet. The URL includes the name of the file that is being requested and the IP (Internet Protocol) address of the server on which it is to be found.

Each request is routed through one or more of the routers and switches that form the Internet to the server identified in the URL. That server then returns the requested page through the Internet to the client machine that requested it.

Web services is a term applied to application logic or application software modules that can be exposed to and shared with others over the Internet via a standardized interface mechanism. The standard paradigm on the Web is based on the exchange of files containing displayable information, e.g., Web pages. Thus, the Web services concept can be considered an extension of this paradigm to automated exchange of software modules between nodes of a network, i.e., machine-to-machine, or business-to-business interfaces. Furthermore, the receiving node can automatically set up and run the software without human intervention.

Currently, the Web services landscape is a an evolving collection of inter-related standards and implementations. Presently, there is no system for aggregating all of the necessary information to fully describe, deploy and manage the life cycle of a Web service. Web services description language (WSDL) is an XML-based language that is central to the future development of the Web services paradigm. WSDL is used to describe the services a business offers and to provide a way for others to access those services via the Web (or any other network). The UDDI initiative is an XML-based registry standard by which businesses list themselves and the Web services they offer on the Internet. WSDL is one approach to describing such Web services. A key goal of the UDDI initiative is to enable companies to find each other and each other's Web services on the Internet and to make their computer systems inter-operable with each other in order to facilitate electronic commerce. The UDDI initiative allows businesses to list information about themselves, e.g., name, location, and/or the Web services they offer.

Simple object access protocol (SOAP) is an XML-based messaging protocol that enables a program running in one kind of operating system (e.g., Windows 2000) and programming language runtime environment, to communicate with another program regardless of whether it is running in the same or a different kind of operating system and/or programming language runtime environment. SOAP uses a transport protocol, such as HTTP, SMTP (Simple Mail Transport Protocol), and HTTP(R) as the mechanism for information exchange. Specifically, since HTTP and XML are generally available and, in fact, typically are pre-installed in all major operating system platforms, they provide an at-hand solution to communicating information across programs running under different operating systems. SOAP specifies how to encode XML payloads in HTTP so that a program in one computer can call another program in another computer and pass it information. It also specifies how the called program can return a response. Current Web service environments assume that each service stands alone and is bound to a single location. This adversely affects the ability of service providers to handle basic electronic commerce issues such as load balancing, work load management, charge back accounting, pay-per-use accounting, service leasing and service distribution. This, in turn, inhibits the development of robust electronic market places and severely hampers the practical implementation of the Web services paradigm.

It is an object of the present invention to provide a software construct that provides a framework for the management of a Web service.

It is another object of the present invention to provide a method and apparatus for automatically and dynamically configuring Web services across multiple network end points.

It is a further object of the present invention to provide a method and apparatus for dynamic, adaptive deployment, management, discovery, and/or publication of Web services.

It is yet a further object of the present invention to provide a method and apparatus for dynamically reconfiguring Web services infrastructure based upon context.

SUMMARY OF THE INVENTION

The invention provides a software construct, herein termed a Web service container, for managing Web services at a network node and an adaptive model for the dynamic configuration of a plurality of Web service containers distributed throughout a network, such as the Internet or an intranet, in a software and hardware platform-independent manner. The containers dynamically adapt themselves and, particularly, the Web services contained therein based upon a pluggable set of heuristics. These heuristics may include, but are not limited to network traffic and current workload. Since the heuristic framework encapsulated within the container is extensible by the end user, businesses may provide their own set of customized algorithms. Further, the behavior triggered by the heuristics framework is pluggable as well. For example, businesses may configure their containers to deliver Web service module code only when the request is from a container with the proper security credentials and/or is located behind the corporate firewall. The Web service containers can also send and receive Web service software modules to and from other Web service containers on the network. Accordingly, containers can communicate with each other via the network to determine contextual information such as the identity of each other, the capabilities of each other, the operating systems or platforms of each others, the contents of the container (i.e., the available Web services at that location), etc.

By providing a container framework and the ability to exchange contextual information, the present invention allows containers to dynamically exchange Web services software as well as contextual information, such as current workload, so that containers are virtually limitlessly reconfigurable based on context. For instance, containers can, not only reconfigure themselves as routers, but can load and unload Web service software modules based on detected workload and/or Web service availability of other servers and send software modules to peer containers as needed to allow them to run a Web service locally rather than from a remote location on the network.

The invention enables one server with a Web services container to send Web services software to another server with a Web services container in order to allow that other server to begin providing that service. This may be useful, for instance, when the work load at a first server exceeds that server's capabilities. That server can then send the Web service software to one or more other servers and then divide the servicing of requests for that service amount two or more servers. The first server, for instance, can reconfigure itself either partially or totally as a "service router" to route requests for given Web services to other servers that it has determined can provide that service either by virtue of it having itself send the Web service software to the other server(s) or by querying the other server(s) as to the contents of their Web service containers.

Web service containers also may be deployed at client machines to manage Web service related tasks. For instance, another routing scenario involves a request being received by the first server. Acting as a "service router", the first service directs the request to the second server. When the second server responds to the request, it includes context information that indicates it was the node that ultimately handled the request. The container that initiated the request understands the contextual information returned and for each subsequent request, directs the outgoing message to the second server. This can be logically thought of as dynamically adding a WSDL port to the service and indicating that the new port is the preferred endpoint. In this manner, any number of "hops" may be taken before reaching the ultimate destination, but network efficiency is gained by providing a mechanism that avoids unnecessary processing from the second service requests forward.

Not only can Web services software be exchanged in a platform independent manner, but the Web service containers themselves are platform independent. That is, the Web service containers at two different network nodes can be implemented in different programming languages and run on different platforms, while still being able to exchange contextual information and Web service software modules using SOAP and WSDL.

DETAILED DESCRIPTION OF THE INVENTION

Figure 1:
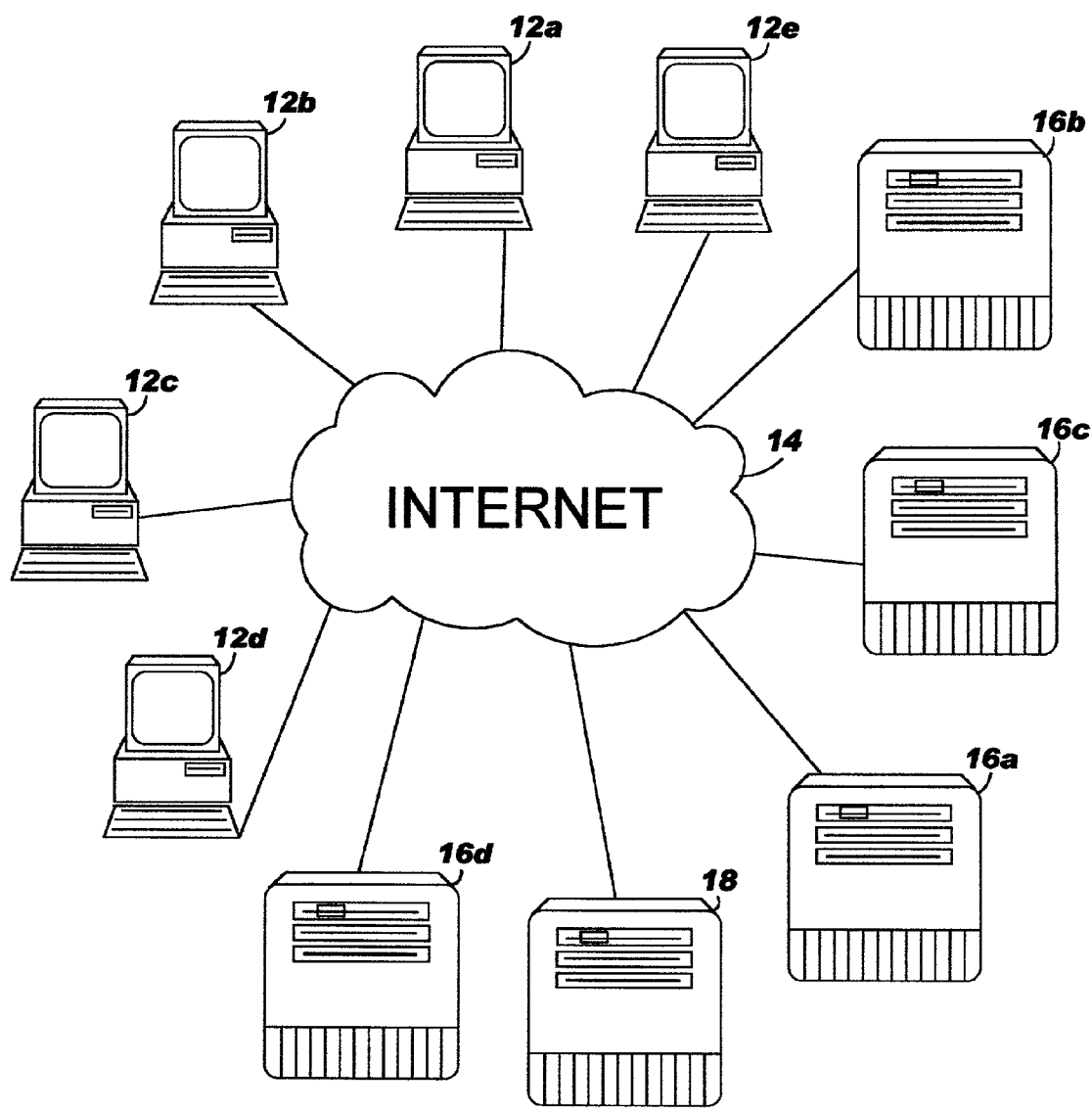
FIG. 1 is a block diagram illustrating the basic components of a communication network within which the present invention can be implemented.

FIG. 1 is a block diagram of a network, such as the Internet, in which the present invention can be implemented. The network is shown as blob 14 and comprises a series of interconnected computers, routers and switches (not shown) that essentially allow any computer on the network to communicate with any other computer on the network. Computers 12a-12e are client computers that issue requests via the network to server machines on the Internet. Computers 16a through 16d are servers that serve information to client machines responsive to requests received from those client machines 12a-12e via the Internet 14.

A Web service container in accordance with the present invention essentially is a front-end software module that serves as the interface between the local Web services (i.e., the Web services contained in the container) and other Web service containers located at other network nodes. In a preferred embodiment of the invention, the container interface is itself described using WSDL. The container therefore can be treated as a Web service itself, its "service" being Web service life cycle management. Hence, a Web service container primarily has the same attributes and behaviors of any other Web service. In fact, it is expected that containers will be registered in registries such as UDDI as a service. The invention is not limited to any particular registry.

Positioning containers as Web services enables the existence of container implementations on different platforms, including, for instance, PDA (personal digital assistant) platforms and wireless device platforms, that can communicate with each other based on, for instance, WSDL descriptions of Web services even though they are implemented in different programming languages and may run on different platforms. Further, a single management client can administer multiple containers regardless of implementation or platform.

The concept of recognizing a peer container on the network for the purpose of interchanging information is herein termed container discovery. Containers essentially are peers of each other and, thus, any suitable peer-to-peer communication mechanism can be used for container discovery. Container discovery can be enabled in many ways, four of which are discussed below. First, containers can register themselves and their contents with a Web service registry, such as UDDI or DISCO, and containers can query the registry for network nodes that have a specific tModel that represents the container.

Secondly, either in addition or alternately, container discovery can be carried out via a peer-to-peer protocol, such as JXTA, a peer-to-peer communication protocol developed by Sun Microsystems, Inc. A third option is for the container to include its contextual information in the SOAP header of any service requests. When the receiving container processes the incoming request, it will understand the SOAP header and therefore become aware of the container that originated the message. This type of discovery is termed "intimate discovery" because awareness is facilitated via a "conversation" between two containers. Finally, WSIL (Web Services Inspection Language) is another mechanism that can be used for container discovery.

Figure 2:
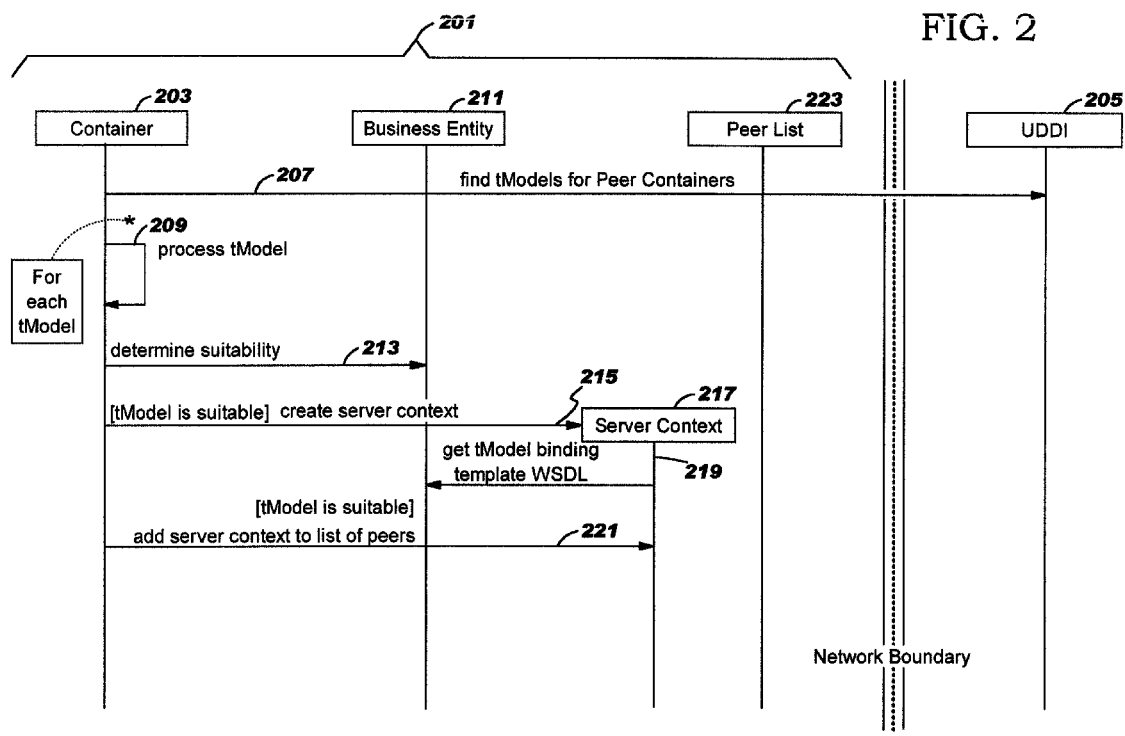
FIG. 2 is a Universal Markup Language flow diagram illustrating request and response flow over a network in accordance with one aspect of the present invention.

FIG. 2 is a Universal Markup Language (UML) flow diagram illustrating container discovery according to the first method discussed above, i.e., through a registry such as UDDI. In the first step, the container 203 running on a server 201 issues a query 207 across the network to a UDDI server 205 seeking tModels consistent with the tModel of its peer containers. The UDDI directory returns to the requesting server 201 a list of tModel binding instances corresponding to the peer containers of container 203 in accordance with the specified tModel. It will be understood by those of skill in the art that in the standard protocol for UML diagrams such as those shown in FIGS. 2 and 3, responses to queries are assumed but not shown. Only the queries are shown. More particularly, the UDDI directory returns a WSDL document containing a set of objects, the objects being the definites of the peer containers.

Then, as shown at 209, the container processes each returned tModel to derive the business entity ("business entity" is a Java class name). The business entity is a particular WSDL document and access point. The container 203 then issues a query 213 to the business entity 211 obtained through UDDI to determine its suitability. Suitability is determined as a function of any criteria that the programmer of the container considers advisable. Such criteria may include, for instance, the container must be behind the same firewall as container 203 or the container must use a particular transport mechanism. Then, for each tModel which meets the suitability criteria, in step 215, the container creates a server context 217 for the business entity 211. Then, the server context 217 issues a query 219 to the business entity 211 for the tModel binding template WSDL. Finally, in step 221, the container 203 adds the server context to its list of acceptable peers 223.

Figure 3:
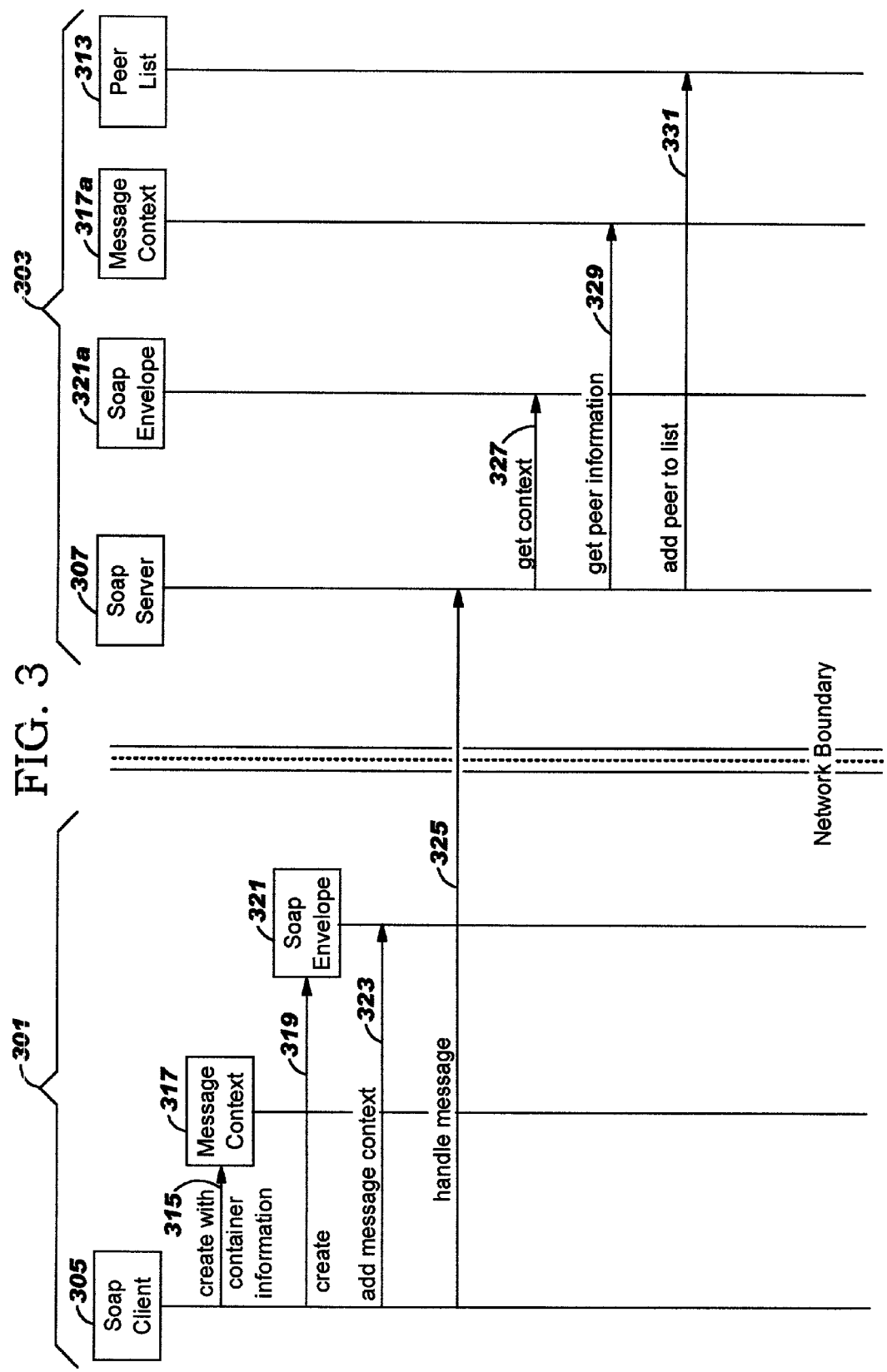
FIG. 3 is a Universal Markup Language flow diagram illustrating request and response flow over a network in accordance with another aspect of the present invention.

FIG. 3 is a UML flow diagram illustrating container discovery in accordance with the third technique discussed above, i.e., the use of SOAP headers in service requests. In FIG. 3, the software entities to the left of the network boundary, for instance, are collectively found at a first network server 301 running a container in accordance with the present invention. The entities to the right of the network boundary are collectively found at a second server 303 running a peer Web services container. As will become clear from the discussion below, server 301 is acting as a SOAP client and server 303 is acting as a SOAP server in this example. However, both servers 301 or 303 should be able to act as a SOAP client or SOAP server depending on context.

To the left of the network boundary, a SOAP client 305 is running at the first server 301, which includes a container in accordance with the present invention. In this example, server 301 will send its Web services information to server 303. In step 315, client 305 creates a message context 317 defining its container. The message context contains relevant information about the container, such as the fact that it is a certain type of Web services container (so that other containers can determine whether it is a peer), its network location, its capabilities, and the Web services that it manages. In step 319, it creates a SOAP envelope 321 which will be used to send a message out over the network. In step 323, it adds the message context 317 into the SOAP header. Then, it sends the message 325, including the message context in the SOAP header to another server 303. If server 303 does not have a container in accordance with the present invention, it simply ignores the message context in the header and cannot use the information. However, assuming that server 303 has a Web services container in accordance with the present invention, a SOAP server 307 receives the message 325. If server 303 has a container in accordance with the present invention, SOAP server 307 will have a handler for handling the message context 317. Accordingly, in step 327, SOAP server 307 queries the received SOAP envelope 321 a to get the message context 317a. Then, in step 329, SOAP server 307 queries the received message context 317a to derive the peer information. Finally, in step 331, SOAP server 307 adds the peer information to its peer list 313. Accordingly, server 303 is now aware of server 301, including, the fact that it is running a peer container and what Web services are available in that peer container.

While UML diagrams usually do not show the responses to queries, it deserves special note that, in the example of FIG. 3, server 303 is sending responses back to server 301. In a preferred embodiment of the invention, when a server like server 303 receives SOAP messages from other servers, such as server 301, identifying themselves as running peer containers, its response includes an additional SOAP header with its own message context. Accordingly, although not expressly shown in FIG. 3, server 303 preferably is returning to server 301 the same type of Web services container information that it is receiving from server 301 such that both servers 301 and 303 discover each other simultaneously.

Container discovery is one of the key advantages of the present invention because it provides the ability for containers to share their contextual information (e.g. the services they are hosting, how busy they are, where they are located, etc.) and, based on such information, automatically reconfigure themselves to best handle incoming service requests from the network. Further, since the code module that implements a Web service may be dynamically located on the network, that is, moved between containers, container discovery ultimately facilitates dynamic reconfiguration of the network itself (e.g. message routes).

With respect to the use of Web services registries such as UDDI and DISCO for container discovery, the containers can register with one or more registries upon deployment. Subsequently, when a service is added to a container, the container can automatically add appropriate end points to the service registries into which the container previously registered upon deployment. Likewise, when a Web service is taken offline at a container, the container can remove the service from the registries in which it had been published. Further, each container should automatically perform a cleanup operation upon container shut down, including notifying all registries that the container and all it contents should be removed from the registry.

The containers manage the mapping between the available (active) network access points and the services deployed in the container. For instance, multiple services may be bound to the same network access point. Likewise, a single service may be bound to multiple access points, such as HTTP, and MQ Series (a messaging product offered by IBM) or SMTP.

In addition to managing multiple services, a container also may manage multiple network access points, e.g. an HTTP access point, an HTTPS access point, an MQ access point, an SMTP access point, etc. Typically, WSDL documents comprise two parts, an abstract interface document and an implementation document. The interface document declares what the service can do (e.g., convert dollars to euros or I am a container in accordance with a certain tModel). The implementation document declares an implementation. This document ties the network access points to a particular service interface. For example, the implementation document discloses that network access point www.ibm.com/smalltalk/webservice/currencyconverter:80 is bound to the abstract interface described in the interface document. Therefore, a physical network access point may be bound to multiple services. Likewise, a service can be bound to multiple network endpoints.

However, there is a shortcoming in existing Web services protocols in that the implementation document is static. Thus, the implementation document is created specifying certain endpoints, which, hopefully, are, in fact, available, but may not be. Further, the static nature of the implementation document makes it difficult to manage different deployment environments such as development, quality assurance, production, etc.

In accordance with the present invention, the containers manage the network endpoints and dynamically generate the implementation documents. When a service is deployed into and managed by the container, the implementation document will include all the (user specified) access points The dynamically generated implementation WSDL document is then published to a registry, such as UDDI.

This is a significant feature of the invention because, when an endpoint is taken off line, a container can dynamically republish an implementation document. This provides a clean separation between development of the interface and runtime deployment.

This encapsulates the service's findings and guarantees that they exist when deployed. Allowing the container to generate a network binding for a service enables the same service to be deployed across multiple containers, each with different network access points. Further, service hosting is simplified because the hosting container specifies the network binding.

The containers provide a framework for dynamically configuring Web services on the network. The functionality of the containers may include dynamic WSDL port binding. For example, let us consider a container that supports network access points for MQ Series, SMTP and HTTP and provides a service who's WSDL specifies an HTTP network access point. Since the container can listen on MQ and SMTP access points too, the service could be automatically bound to these network access points as well. The container also can provide real time WSDL generation. For example, the container can serve as the WSDL repository for the Web service implementation definitions. Further, since the container manages the correlation between WSDL port and access points, it can automatically generate the WSDL binding document when a service is deployed. Therefore, the Web service developer can focus strictly on the interface of the Web service.

Additional possible functionality includes remote deployment and management of Web services. Particularly, since the container is modeled as a Web service, deployment may occur utilizing standard Web service method techniques such as SOAP over HTTP(S). Therefore, this inherently provides the ability to deploy and manage the Web services remotely.

The containers include code for dynamically reconfiguring the services it provides and/or the way in which it provides those services based on context. That is, based on observations it is able to make about its own request load, including requests for particular Web services in the container that are being used, as well as observations it can make about the availability of services and the request loads of other containers on the network, such as through the UDDI registry or peer-to-peer queries. Envisioned reconfiguration options include: 1) just-in-time service loading, 2) loading of Web services from remote locations, such as other containers, 3) invocation of service proxies that route requests for services to other containers (e.g., other servers) that have the requested Web service available, 4) requesting and loading copies of services from other containers, 5) accounting and charge back management with respect to the use of the services by clients, 6) peer-to-peer load balancing, 7) container cloning, and 8) self initialization.

The software "container" concept in which the container is modeled as a Web service itself provides the functionality to enable all of the above features and more. The container can observe local conditions such as its load as well as external conditions of other containers as discovered through the use of UDDI and/or peer-to-peer communications then adapt itself and/or request other containers to adapt themselves accordingly.

The follow paragraphs expound upon and provide examples of the features mentioned above.

In order to minimize the software that must be loaded on a server at startup, once a service is deployed, the container may wait until the first invocation of the service (such as might be generated in response to an incoming client request for that service) to load the code. More particular, the container is able to start itself up without incurring the penalty of having to load and start all registered services at that time. Instead, the services can be loaded on demand, i.e., responsive to the first client request for a particular SOAP message that is part of a registered service. At that time, the Web services implementation can be loaded. It should be noted that, in accordance with aspects of the invention discussed in further detail below, this is not the only way for a container to handle a request for service. For instance, as discussed below in connection with the "edge server" feature, a container may contain merely a proxy for a service. This just-in-time aspect of the invention is not limited to loading of the service, but can be applied to any of the ways that a request may be handled by a container. Thus, for example, if a particular container is to act as a proxy for a Web service provided in another container, then it would load the code necessary to serve as proxy responsive to the first pertinent request, instead of loading the Web service code.

Since the Web service containers can be made aware of the contents of other containers by querying the UDDI registry or by peer-to-peer communication, it is possible to dynamically position Web services on the network based upon various heuristics such as "point-of-demand." This feature is referred to in this specification as "location transparency" since the actual physical network location of a Web service may be transparent to the client consuming the service. Location transparency allows containers to dynamically load Web services from remote network nodes by requesting the code and the binding information necessary to host the Web service. Some of the binding information may be automatically generated to match the hosting container. The following are several examples of scenarios that illustrate the utility of location transparency.

A. Edge Servers

Figure 4A:
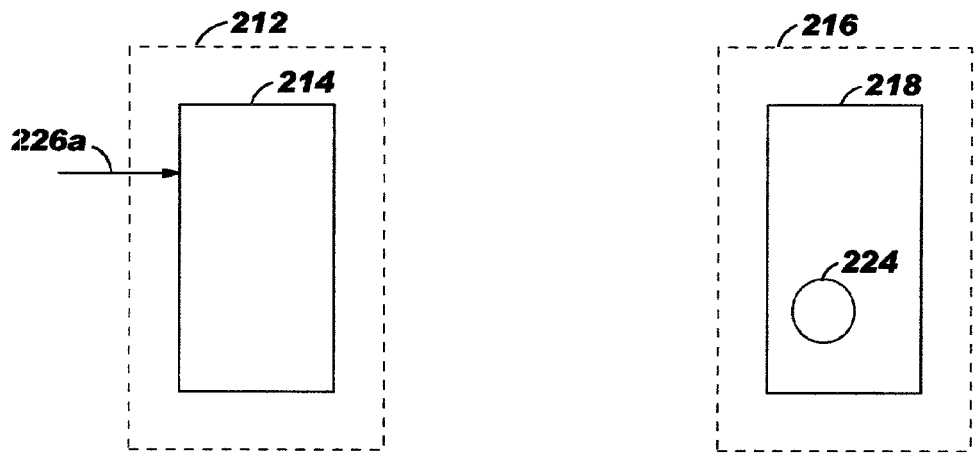
FIGS. 4A-4I are block diagrams of a plurality of servers illustrating various configurations that can be established dynamically in accordance with the present invention.

Edge servers reside at the point-of-demand on the network. That is, an edge server is the server that receives a client request. Edge servers typically are used for caching static pages and performing work load management. However, applying the present invention, edge servers can be used to dynamically reconfigure the service environment. Let us assume a network topology as shown in FIG. 4A, in which an edge server 212 running a Web service container 214 in accordance with the present invention acts as the front end for a back end business server 216, also running a Web service container 218 in accordance with the present invention. Edge server 212 receives a client request 226*a* that requires use of a currency conversion Web service 224 resident on the business server 216. The edge server 212 asks its container 214 to handle the request. Let us assume that container 214 has no services deployed, but is aware of the services available on other servers, including, at least, the business application server 216. Alternately, container 214 may actually have the currency conversion software deployed. However, let us assume that container 214 has been programmed with a predetermined threshold of Web services requests per hour it should handle and that the threshold has been exceeded.

Figure 4B:
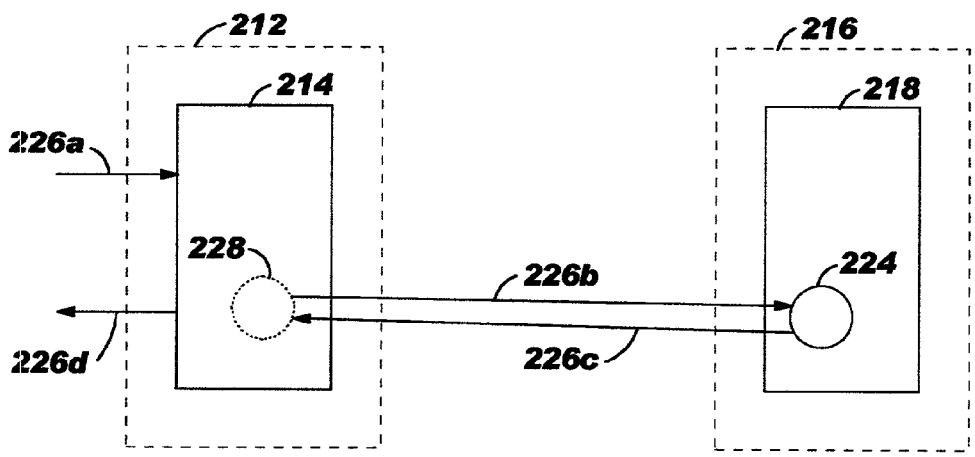

Referring now to FIG. 4B, container 214 therefore creates an intelligent proxy 228 to the currency conversion Web service 224 in the container 218 in the business application server 216. The intelligent proxy 228 is a software module that forwards the request (or at least the relevant content of the request necessary to provide the service) to the container 218 of the business application server 216 in a message 226*b*. The currency conversion Web service software module 224 calculates the requested information and returns it to the proxy in message 226*c*. The messaging between the servers, for example, may be implemented in SOAP. The proxy software module 228 then returns it to the requesting client in a normal HTML response 226*d*. All subsequent requests for the currency exchange service received by edge server 212 are forwarded to the currency conversion Web service on the business application server in the same manner.

Figure 5:
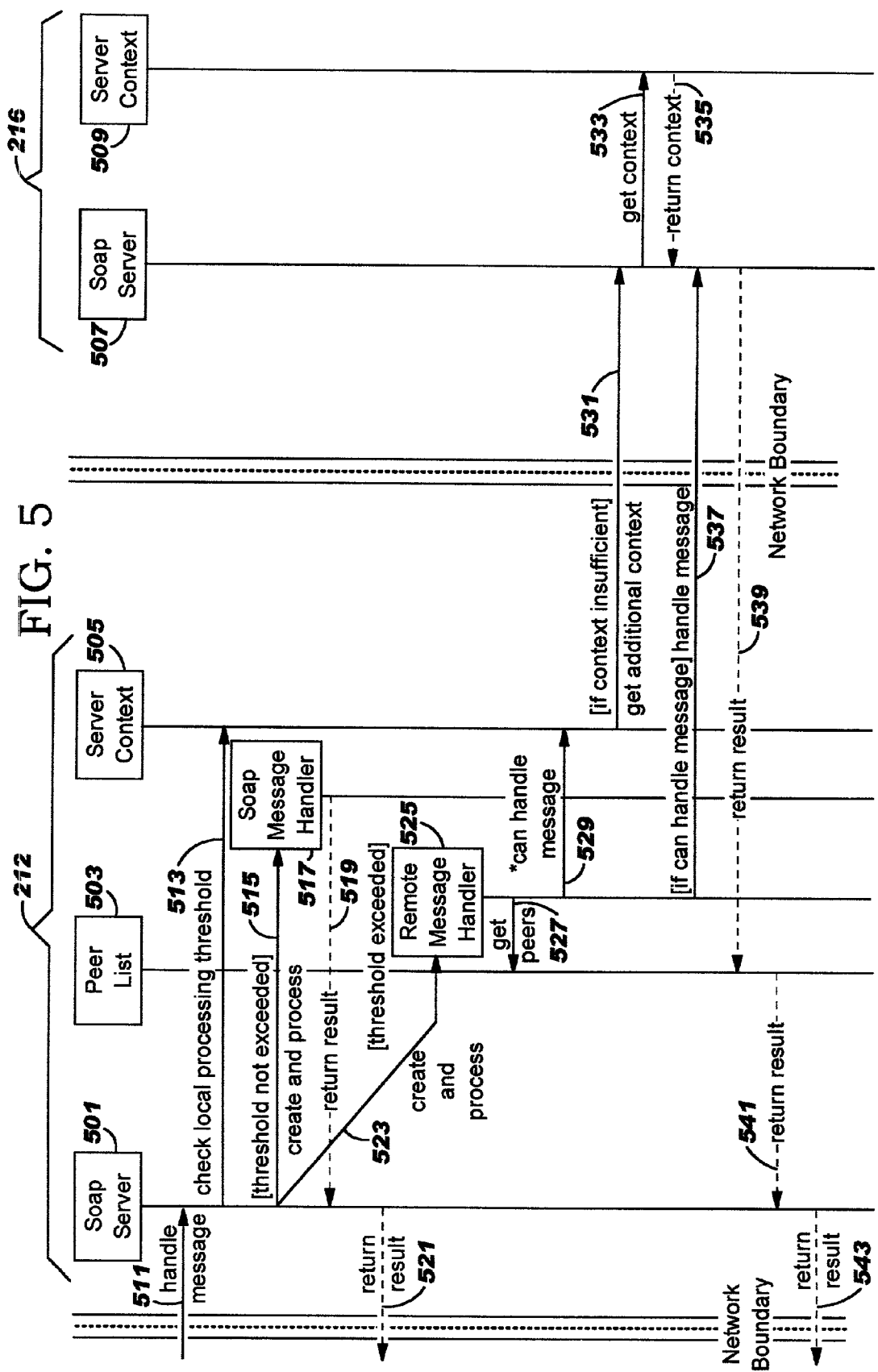
FIG. 5 is a Universal Markup Language flow diagram illustrating request and response flow over a network in accordance with a further aspect of the present invention.

FIG. 5 is another UML diagram illustrating routing of a request for a Web service, such as the currency conversion service from a first server such as server 212 to a second server, such as server 216, consistent with the examples discussed above in connection with FIG. 4B. For purpose of illustrating various and additional aspects of message handling in accordance with the present invention, let us assume in FIG. 5 that the first server (the edge server) 212 has a copy of the currency conversion software, but the request threshold has been exceeded. As illustrated in FIG. 5, the SOAP server 501 in the container 214 of server 212 receives a message 411 from a client over the network requesting the currency conversion Web service. In step 513, SOAP server 501 checks its server context to determine if its processing threshold has been exceeded. If the threshold has not been exceeded, then the message 511 would be handled very simply by creating (step 515) a SOAP message handler 517 for handling the message. That handler 517 would perform the service and return a result 519 to SOAP server 501. SOAP server 501 would then further return that result in a response 521 to the requesting client.

However, if the threshold is exceeded, from step 513, the next step would be step 523, in which SOAP server 501 creates a remote message handler 525. Then, in step 527, remote message handler 525 consults the container's peer list 503 to obtain the list of peer containers. In step 529, remote message handler 525 consults the server context 505 of the peers listed in peer list 503 to determine if any one of them can handle this particular message. Let us assume for sake of illustrating even further features of the invention, that the server context information 505 for one or more particular peer containers contains insufficient information to determine whether it can handle the message. Accordingly, in step 531, the server context 505 is sent in message 531 over the network to the SOAP server 507 of the particular peer container. SOAP server 507 consults its own server context 509 to get the additional needed information and returns that additional contextual information (as shown in step 535) to the SOAP server 507. Although not shown in FIG. 5, that additional contextual information is further returned from SOAP server 507 to server context 505 and then on to the remote message handler 525.

Now, assuming that one of the peer containers to container 218 can handle the message, remote message handler 525 forwards the message, as shown at 537, to SOAP server 507 in container 218. SOAP server 507 processes the request and returns the result to the remote message handler 525, as shown in step 539. Remote message handler 525 then returns that result to the SOAP server 501, as shown in step 541. Finally, the SOAP server 501 returns the result to the requesting client, as shown in step 543.

Figure 4C:
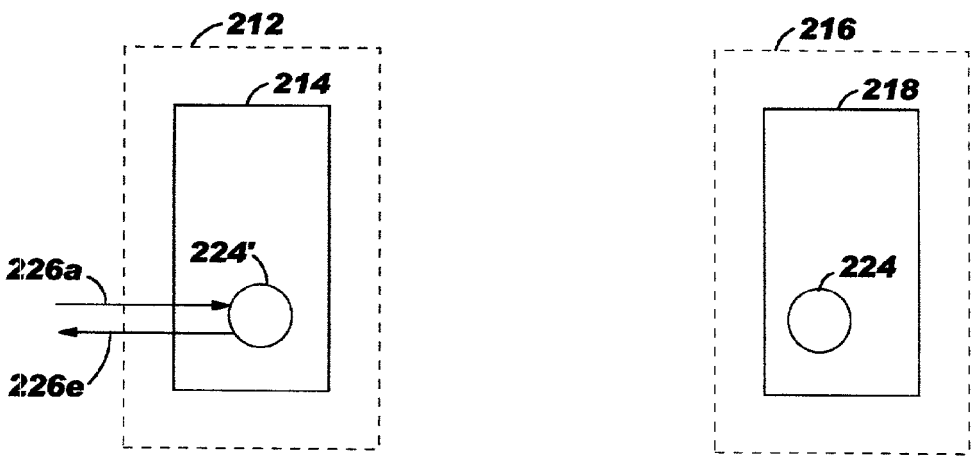

Now, let us consider another example in which container 214 does not have a local copy of the currency conversion Web service and is programmed to attempt to obtain a copy of the Web service to host locally when the number of requests for the Web service exceeds a certain threshold. Referring now to FIG. 4C, when this threshold is exceeded, the container 214 of edge server 212 is programmed to request the code for the currency conversion Web service and the binding information necessary to host the service from container 218 of business application server 216. FIG. 4C illustrates the resulting configuration after container 218 responds to the request. In essence, the edge server's container 214 receives a copy 224' of the service that can be hosted locally. Once the necessary code and binding information is received, the edge server's container 214 replaces the proxy with the real Web service object 224. All subsequent requests for the currency conversion service received by edge server 212 result in a local message send to the local copy of the currency conversion software module 224', rather than a remote message to the business application server's copy.

Figure 6:
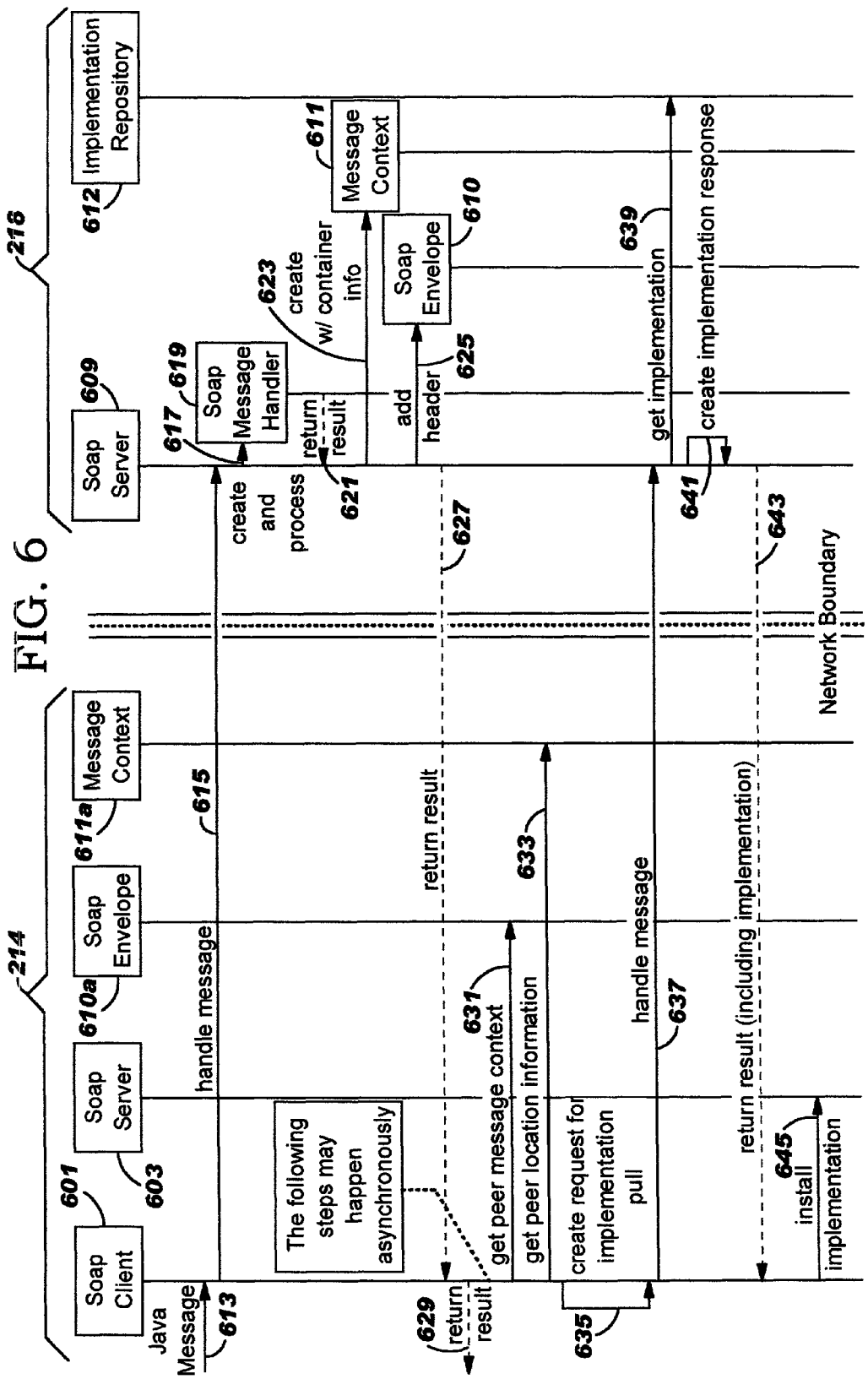
FIG. 6 is a Universal Markup Language flow diagram illustrating request and response flow over a network in accordance with yet another aspect of the present invention.

FIG. 6 is a UML diagram illustrating the above described scenario. Particularly, SOAP client 601 in container 214 of server 212 receives a request 613 for the currency conversion Web service. Client 601 forwards the request across the network in message 615 to SOAP server 609 of container 218 of the remote server 216. In order not to obfuscate features of the invention intended to be illustrated by FIG. 6, the steps of creating and inserting the message context into the SOAP envelope (such as illustrated in steps 315 through 323 in FIG.

3) are not shown in FIG. 6. However, it should be understood that those steps are performed to create the message which is sent in step 615.

In step 617, server 609 creates a SOAP message handler 619 to handle the message. In step 621, handler 619 handles the request and returns a result to SOAP server 609. Then, in step 623, SOAP server 609 creates a message context 611. In step 625, SOAP server 609 adds the message context into the header of a SOAP envelope 610. SOAP server 609 returns the result to the SOAP client 601 in a SOAP message 627 having a SOAP envelope including the message context in the header.

As previously discussed in connection with FIG. 3 (and particularly steps 315-325), in steps 623 and 625, server 216 inserts additional information about itself into the message 627 containing the currency conversion result. In this case, that information may include, for instance, that it can provide a copy of the currency conversion software to server 212 and including information about the nature of the copy or copies available such as the available platforms. Back at container 214 of server 212, two tasks are to be performed, namely, the result is returned to the requesting client and the container retrieves and installs an implementation of the Web service. These two tasks can occur synchronously or asynchronously. FIG. 6 illustrates an asynchronous embodiment in which SOAP client 601 returns the result to the requesting client in message 629. In an asynchronous embodiment, message 629 can be sent at any time after receipt of message 627.

In addition, SOAP client 601 now has discovered that it can obtain a copy of the currency conversion software and host it locally. Accordingly, in step 631, SOAP server 601 consults the received SOAP envelope 610a to derive the context information from the message 627. Then, in step 633, it consults that message context and determines that it can obtain an implementation of the currency conversion software compatible with its platform and operating system and the location from which it can obtain it. Accordingly, in step 635, SOAP client 601 creates a request for a copy of the currency conversion software. SOAP client 601 then sends the request in SOAP message 637 to SOAP server 609 of server 216. SOAP server 609 then goes to its repository of Web services implementations 612 and retrieves the requested version of the currency conversion software. In step 641, SOAP client 609 creates a response including the selected currency conversion software. It then returns the result 643 to SOAP client 601.

Back at container 214 of server 212, in step 645, SOAP client 601 installs the implementation to its SOAP server 603 in the same Web services container 214.

When the next request for the currency conversion Web service is received from a client, container 214 can now handle the request locally in a manner similar to that illustrated in steps 515 through 521 of FIG. 1.

When the demand for the currency conversion Web service decreases below the predetermined threshold (or some other, lower threshold), the container 214 can offload the currency conversion Web service 224 and replace it again with the proxy 228. In an alternative embodiment, the proxy may not even be reloaded unless and until another client request for the service is received. As demonstrated by the example above, Web services can be distributed via the containers. Further, since containers are peers of each other, they inherently provide a peer-to-peer infrastructure for service distribution.

Further, since containers are Web services themselves, then, by definition, they are hardware and software independent. Hence, location transparency also is a software and hardware independent mechanism for service delivery and distribution.

FIG. 6 illustrated an example in which an edge server 212 requests a copy of an implementation of a Web service from another server 216. This type of interaction might be termed a "pull" of an implementation of a Web service. However, the present invention also enables "pushes" of implementation of Web services, i.e., server 216 can initiate the process of sending an implementation of the service to server 212.

Figure 7:
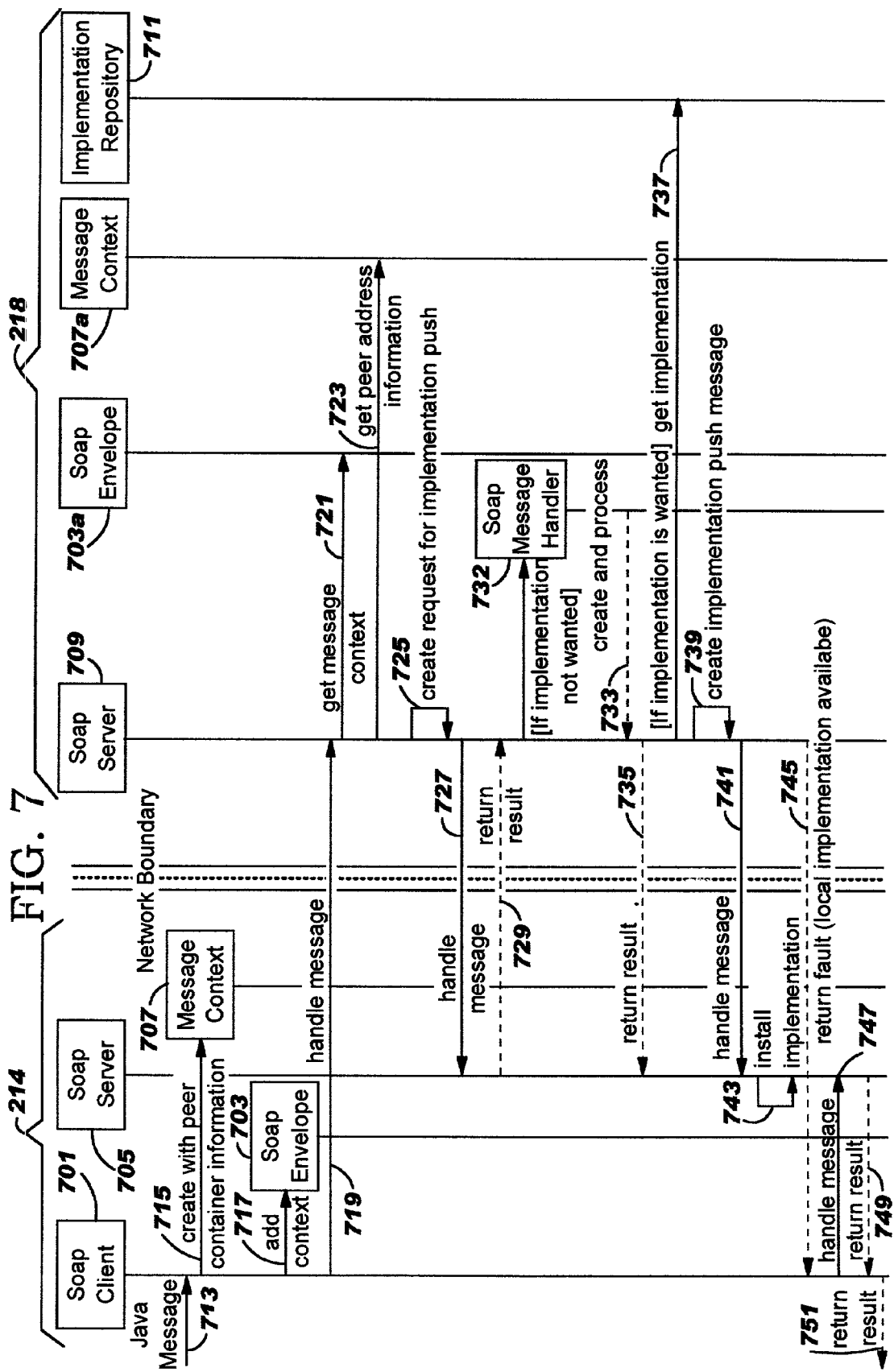
FIG. 7 is a Universal Markup Language flow diagram illustrating request and response flow over a network in accordance with an even further aspect of the present invention.

FIG. 7 is a UML flow diagram illustrating such an interaction. In step 713, SOAP client 701 receives a Java message requesting use of the currency conversion Web service. Accordingly, SOAP client 701 determines that it does not have the service (alternately it might have determined that its message handling threshold had been exceeded) and creates a message 719 to request a remote server to handle the request. The process of creating that message is essentially identical to that illustrated in steps 315 through 325 in FIG. 3. Particularly, in step 715, it creates a message context 707 containing information about its own container. In step 716, it creates a SOAP envelope 703. In step 717, it adds the message context 707 to the envelope 703. Finally, it sends the message 719 to the SOAP server 709 of the remote server.

At the container 218 in the remote server 216, steps 721 and 723 are similar to steps 327 and 329 of FIG. 3. Particular, in step 721, SOAP server 709 retrieves the message context from the received envelope 703a. In step 723, SOAP server 709 retrieves peer information such as the address of the container 214 of server 212 from the message context 707a. Then, in step 725, it creates a request for SOAP server 705 in server 212 to accept a push of the currency conversion Web service. SOAP server 709 sends that request 727 to SOAP server 705.

SOAP server 705 then sends a response 729 back to SOAP server 709. That response should indicate whether or not SOAP server 705 will accept a copy of the Web service. Both alternatives are illustrated in FIG. 7. For instance, if container 214 decides that it does not want to host the Web service, SOAP server 709 will process the portion of message 719 requesting the currency conversion Web service as illustrated in steps 731 through 735. Steps 731 through 735 are essentially similar to steps 617 through 627 of FIG. 6. In short, in step 731, SOAP server 709 creates a SOAP message handler 732 to handle the request for the currency conversion Web service. In step 733, handler 732 returns the currency conversion result to SOAP server 709 Server 709 returns a result in response 735, including a SOAP envelope with a SOAP header containing contextual information about container 218, to SOAP client 701. (Note that steps similar to steps 623 and 625, in which the message context and SOAP envelope that are included in response 735 are developed, are implied, but not shown, in FIG. 7).

On the other hand, if, in step 729, SOAP server 705 indicates that it would accept the Web service, then, flow proceeds from step 729 to step 737. Particularly, SOAP server 709 consults its implementation repository 711 to retrieve a suitable implementation of the currency conversion Web service. In step 739, SOAP server 709 creates an implementation push message to be returned to container 214. That message includes the selected currency conversion Web service implementation. SOAP server 709 sends the message 741, including the currency conversion Web service implementation, to SOAP server 705. Back at server 212 and container 214, SOAP server 705 installs the implementation as illustrated in steps 743.

At this point, there is still a request for the currency conversion Web service that is pending. Particularly, the client that issued the original Java message 713 has not yet received the response. The response to this initial request can be handled in several ways. For instance, server 216 and container 218 can handle this initial request and pass back a response through server 212 such as was illustrated in the FIG. 6 scenario. Server 212 and container 214 would then handle all subsequent requests received by server 212.

However, FIG. 7 illustrates a different scenario. Particularly, in the illustrated scenario, container 218 and server 216 will allow container 214 in server 212 to handle the initial request 713 also. In this scenario, SOAP server 709 returns a fault message 745 to SOAP client 701 including a message that container 214 now has a local implementation of the currency conversion Web service. Accordingly, SOAP client 701 will initiate another message 747 to handle the request. However, now container 214 knows that it has a local implementation of the currency conversion Web service. Accordingly, SOAP client 701 sends this message 747 to its local SOAP server 705. Server 705 invokes the local implementation and returns a result 749 to SOAP client 701. SOAP client 701 then sends a response message 751 to the requesting client.

B. Peer Container Acting as a Client

Furthermore, the invention can be applied to client machines also. More particularly, client machines can run Web service containers similar to those run by servers.

Figure 4D:
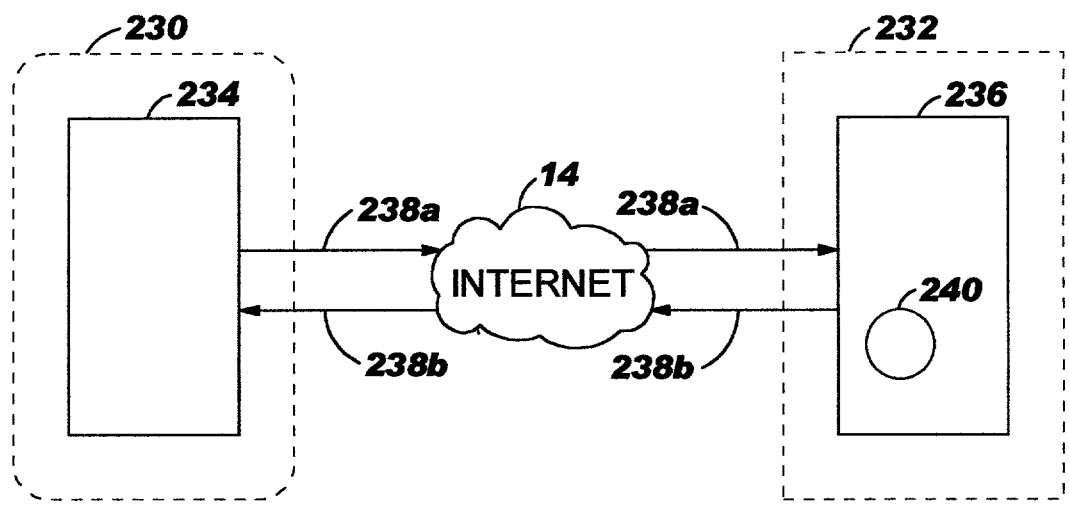

Consider the following example, which helps illustrate two features of the present invention, namely, a client machine running a Web service container and platform independent service delivery and distribution. Referring to FIG. 4D, a client machine 230 and an application server 232 are in communication via the Internet 14. Let us assume that the client machine 230 is a personal digital assistant coupled to the Internet, such as a wireless PALM PILOT™. Each has a Web service container 234 and 236, respectively. A currency conversion Web service 240 has been deployed in the application server container 236 that converts between US dollars and euros using current exchange rates.

Figure 4E:
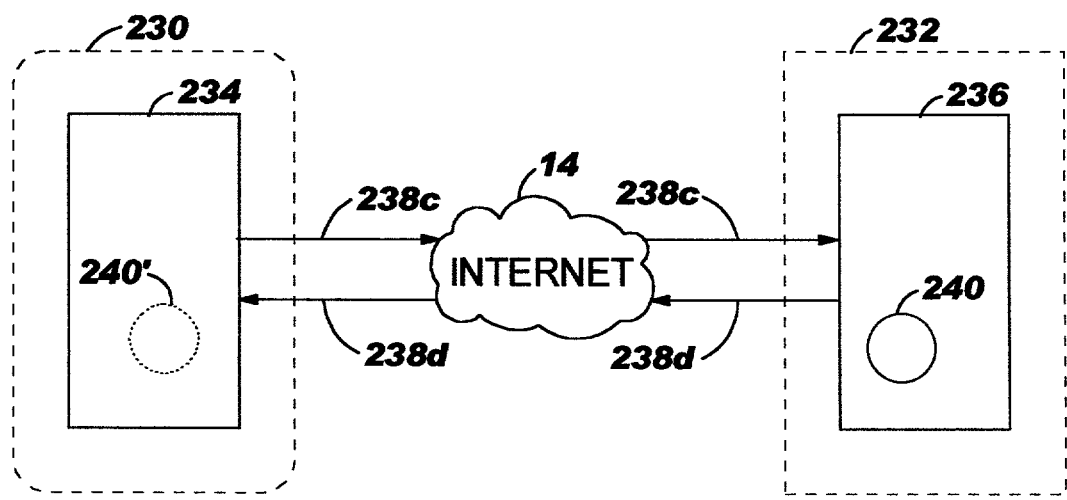

The business application service in PALM PILOT™ 230 can instruct the PILOT™ container 234 to issue a request 238a to the posting Web application server container 236 for a copy of the currency conversion Web service 240. Container 234 can include in the header of that request information about its local container. For instance, it might include in a first request for a Web service the information that the requesting device is a PALM PILOT™ with a JAVA stack. The Web application server container 236 examines the request and recognizes that the container 234 that issued the request has identified that the device on which is it implemented is a PALM PILOT™ device. Let us also assume that the Web application server container 236 has available to it several implementations of the currency conversion Web service software for various platforms, including, for example, the PALM™ platform, a JAVA™ platform and MICROSOFT™'s .Net platform. Thus, the server can issue a response 238b to the request informing the client container of this option. The client container can then choose to download the software or simply have it serviced by the server in the normal fashion. Referring now to FIG. 4E, if the client issues a request 238c to download the software module, the Web application server container 236 issues a response 238d forwarding a PALM™ version of the currency conversion software to the palm container. Upon receipt, the palm container 234 loads the code and dispatches all future requests to the local service 240'. Accordingly, Web service software can be exchanged between network nodes running different software and/or hardware platforms. This concept is termed "location transparency" since the real location and implementation are "transparent" to the ultimate consumer of the service. In addition, this implies a conceptual abstraction of the code representation of a Web service. That is, it may be acceptable for a service to have multiple implementations (e.g. one for cell phones and another for PALM™ devices) that are hidden within a container.

The scenario described above can also be applied to provide game software to requesting clients. All that is required is that the requesting device, e.g., a SONY PLAYSTATION 2™, implement a service container in accordance with the present invention. Games can then be distributed to both PCs and set top boxes automatically.

When a client issues an original request for a Web service, it can include in the header of that request information about its local container. For instance, a PALM PILOT™ might include in a first request for a Web service the information that it is a PALM PILOT™ with JAVA™ runtime capability. Let us assume that the server that receives the request has a copy of the Web service software module in the PALM PILOT™'s platform that the client can download from the server and thereafter use locally, rather than going over the network for the Web service. Thus, the server can respond to the request informing the client container of this option. The client container can then choose to download the software or simply have it serviced by the server in the normal fashion.

C. Accounting and Charge Back Management

Containers in accordance with the present invention also can include code to provide accounting and charge back information with respect to Web service usage. For example, a container may keep aggregate information on the use of a particular Web service by a set of clients and then provide the information for charging those users according to their use of Web services by using a standard predefined billing mechanism. Alternately, a Web service container may aggregate information for Web services that use other Web services in other supported containers.

In even further embodiments, Web service containers in accordance with the present invention may provide automatic micro-payment functionalities. Merely by way of example and not limiting, (1) clients can be charged periodic subscription charges, (2) clients can be charged on a per use basis for each invocation of the service, (3) clients may lease a service (for example, by purchasing a number of invocations or usage for a specified time period), (4) clients may directly purchase and upload a service from a container, and (5) clients may be allowed to use a service for a fixed number of invocations or a fixed time period, after which they must choose to purchase.

D. Web Service Hosting

Containers in accordance with the present invention can be used to provide a Web service hosting mechanism similar to traditional Web hosting in which a provides an infrastructure for hosting a Web site company for a fee. For example, Web services can be developed and then deployed to a container that is maintained by a separate company. The container makes available the services for fees and takes care of the necessary accounting information for proper billing.

In accordance with another aspect of the present invention, a container can be implemented to aggregate other Web service containers together and provide and publish dynamic Web service flows.

The containers can perform load balancing and work load management by tracking statistics on the use of Web services locally and at other supported, remote containers and dynamically allocate new resources at remote peer containers to handle the request load.

E. Container Cloning

The following is an example of container cloning that illustrates another implementation of the aforementioned dynamic network reconfiguration. A Web service container that is a member of a group of peer containers that are supported and managed collectively by a single entity can, upon detection of a request load exceeding a predetermined threshold, request additional containers to implement specific Web services in order to meet the requirements of the load situation. Merely as one example, a container can request that another container become a clone of itself. This may involve starting additional virtual machines as well.

Figure 4F:
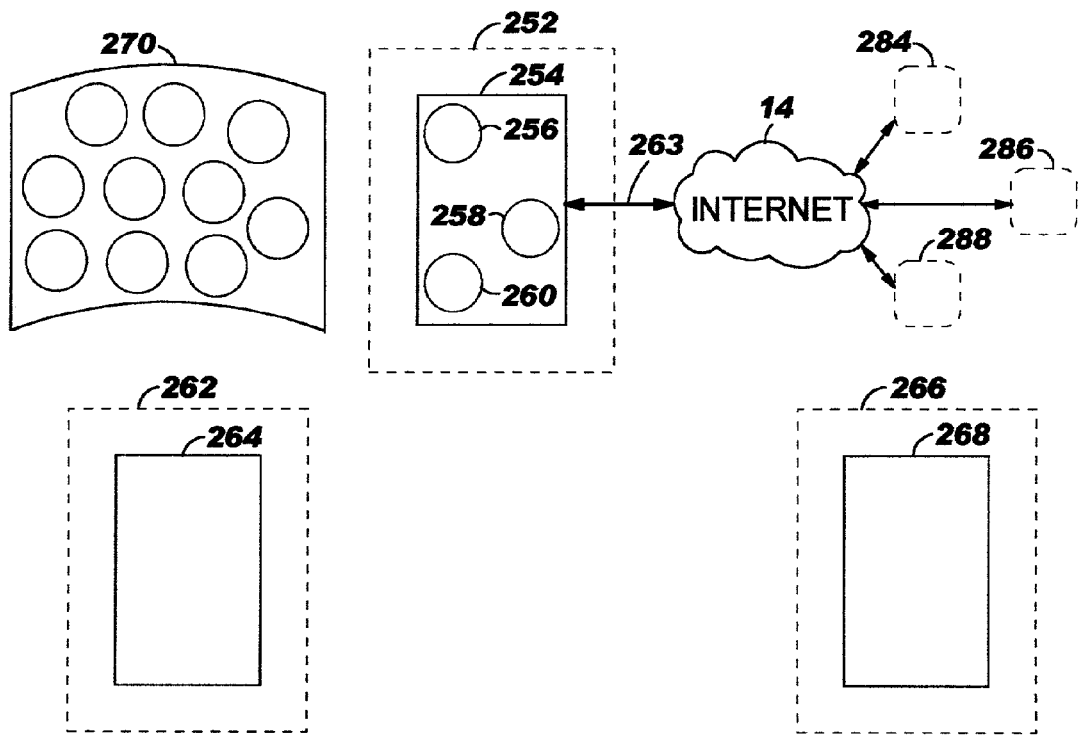
Figure 4G:
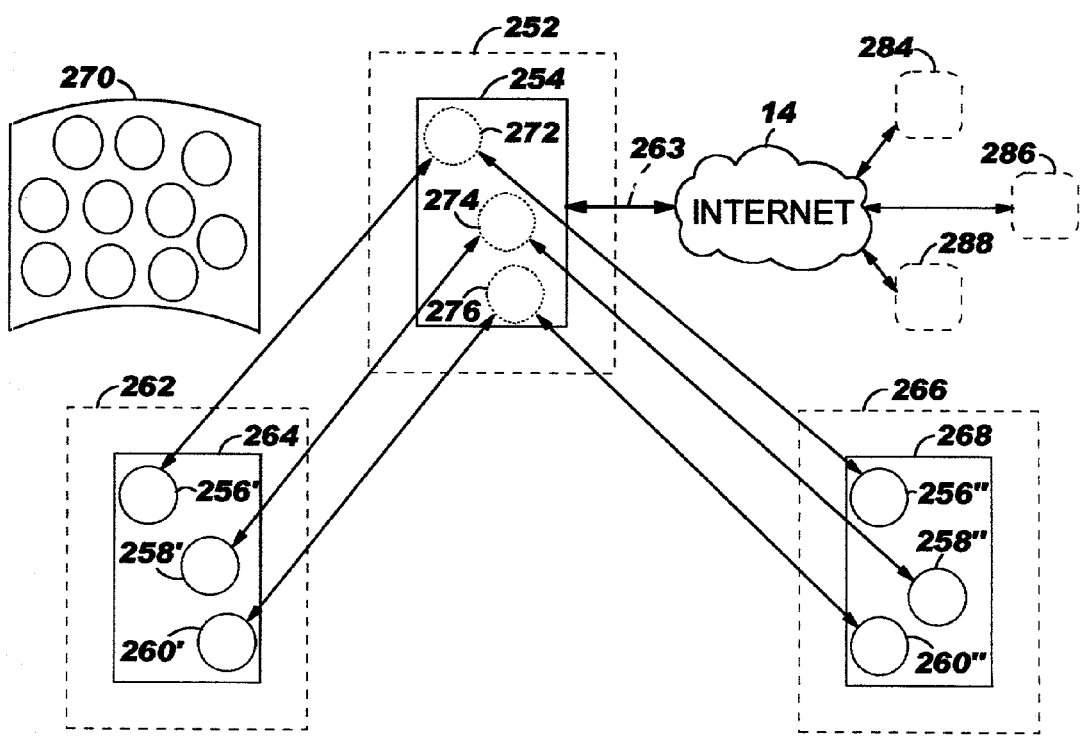
Figure 4H:
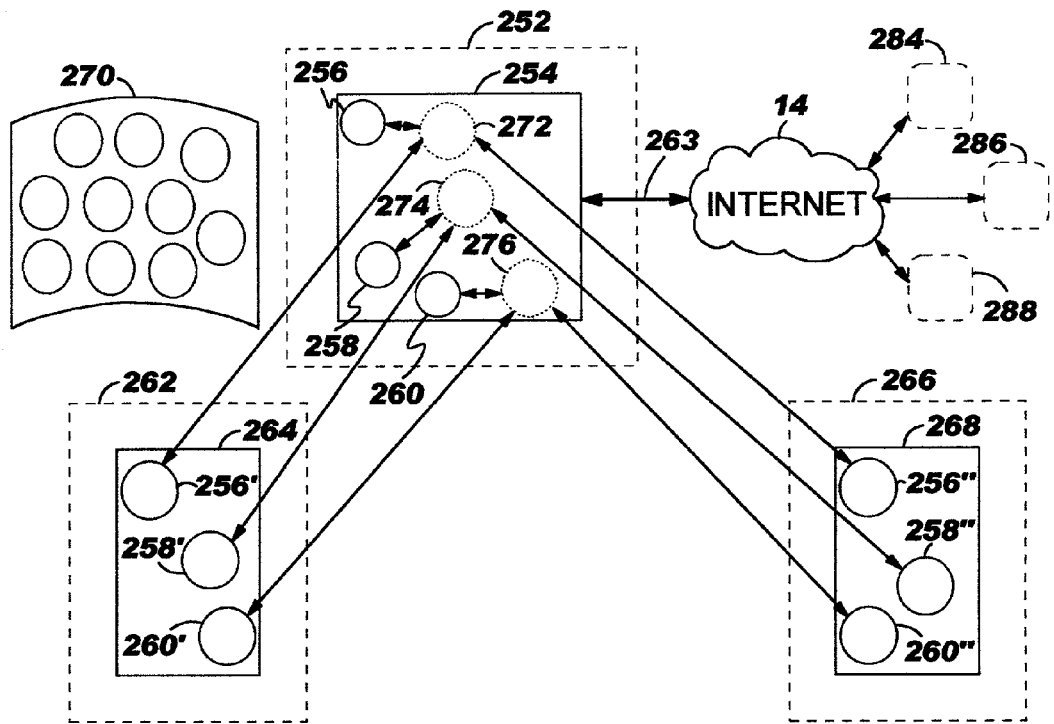

FIGS. 4F, 4G, and 4H illustrate an exemplary scenario. Referring first to FIG. 4F, Web server 252 has a Web services container 254 that hosts a plurality of Web services 256, 258, and 260. When the load of requests 263 from clients, e.g., clients 284, 286, 288, via the Internet 14 in a defined period of time for these Web services increases over a predetermined threshold, the Web services container 254 may choose to ask one or more other Web service containers 264 and 268 of other servers 262 and 266 to begin hosting some or all of those Web services. Responsive to the request, containers 264 and 268 can individually choose to accept the request and load the Web services and necessary binding information either from the first server 252 or from a known repository 270. Thereafter, some requests can be served by each of servers 252, 262 and 266.

The manner in which the requests are distributed among the three containers can take several forms. In one embodiment illustrated in FIG. 4G, the first container 254 can reconfigure server 252 as an edge server that sends the requests to intelligent proxies 272, 274, 276, which distribute the load evenly among the other two servers 262 and 266, which actually provide the services 256', 258', 260', 256", 258", and 260". In another embodiment illustrated in FIG. 4H, the first container 252 can reconfigure server 250 partially as an edge server wherein requests are sent to intelligent proxies 278, 280, 282, which then distribute the load evenly among the Web services 256, 258, 260 available locally at server 252 and the Web services 256', 258', 260', 256", 258", 260" available at the other two servers 262 and 266.

F. Another Start-Up Implementation

In another aspect of the present invention, a server with an empty Web service container can announce its presence to the network upon startup. This can be accomplished, by peer-to-peer communication among the supported containers or by registering with a UDDI registry. The other servers can be allowed to send requests to the empty server to load copies of certain services from them as needed to meet their request load. The previously running servers can reconfigure themselves to act as routers to send all requests by proxy to the new server or partially as routers by servicing some of the requests locally and sending some other requests to the new server.

G. Miscellaneous

Figure 4I:
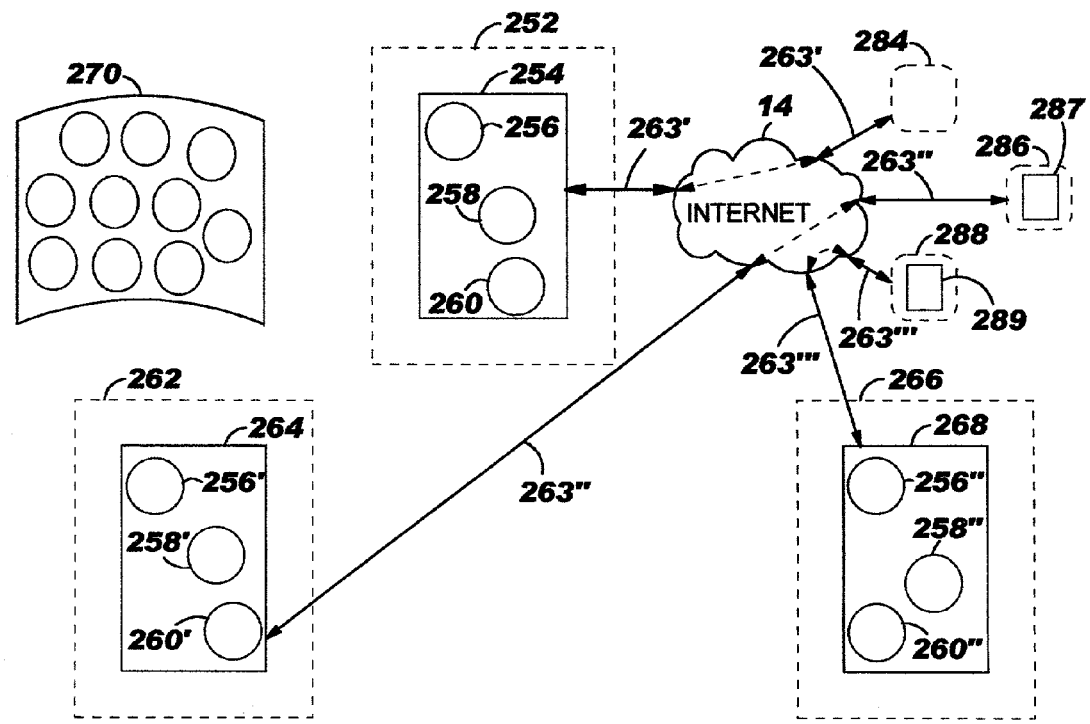

In an even further embodiment, illustrated in FIG. 4I, let us assume that client machines 286 and 288 have containers 287 and 289, respectively, in accordance with the present invention. After servers 262 and 266 become clones of server 252, clients 286 and 288 can be made to start sending future requests 263" and 263'" for those services directly to the other servers 262 and 266, respectively. This will not be possible for client 284 because it does not have a container in accordance with the present invention. Hence, client 284 must continue sending its requests 263' to the original server 252.

Figure 8:
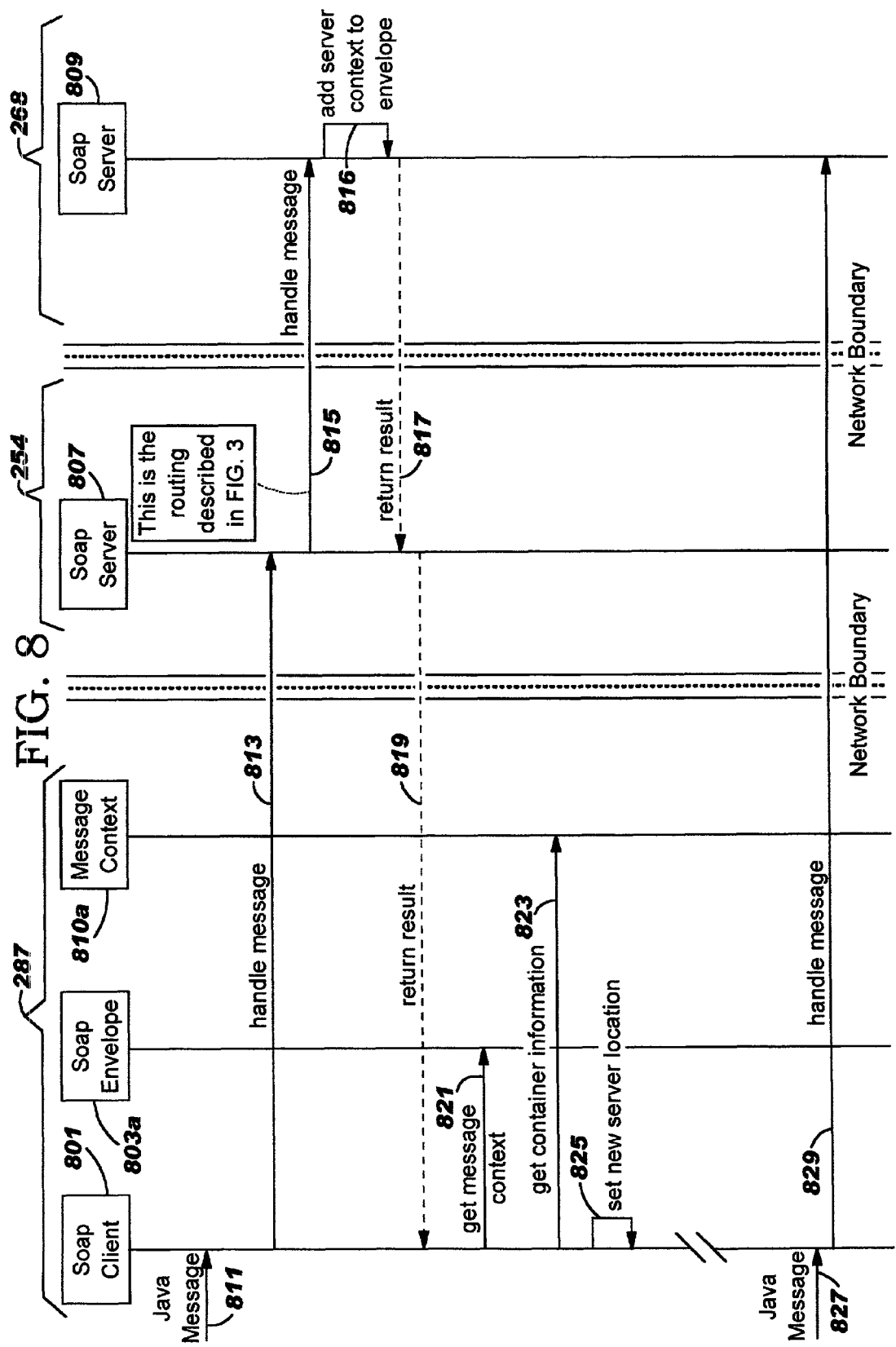
FIG. 8 is a Universal Markup Language flow diagram illustrating request and response flow over a network in accordance with yet one more aspect of the present invention.

FIG. 8 is a UML diagram illustrating one particular way in which a client machine can be caused to switch the server to which it sends its Web services requests. A software module (not shown) in a client machine such as client machine 286 of FIGS. 4H and 4I running container 287, generates a Java message 811 requiring use a currency conversion Web service. SOAP client 801 in container 287 of client machine 286 issues a corresponding SOAP message 813 to SOAP server 809 in container 254 of server 252 requesting that it handle the request. (Although not shown in FIG. 8 in order not to obfuscate the features of the invention intended for illustration in FIG. 8, steps similar to steps 315-325 of FIG. 3 are performed so that message 815 includes a message context in a SOAP header disclosing the fact that client machine 286 has a container and including information about the container.)

SOAP server 807 in container 254 of server 252 receives this first request for use of the currency conversion Web service, determines that it cannot handle the message, and, hence, creates message 815 which is sent across the network to one of the other servers, such as the clone server 262, requesting that it handle the request. Again, it should be understood that, prior to issuing message 815, SOAP server 807 performs steps not shown in FIG. 8 to create and add contextual information about the container 254 in the header of the SOAP envelope of message 815. SOAP server 809 in container 268 of clone server 266 generates a currency conversion result, adds its server message context to the SOAP envelope header (again, not shown) and returns the result 817 to SOAP server 807 of container 254 of server 252. Then SOAP server 807 issues response 819 returning that result to the SOAP client 801 of container 287 of requesting client machine 284. Up to this point, the flow in FIG. 8 is not much different than what has already been discussed in connection with earlier Figures such as FIGS. 3 and 5.

However, at this point, since SOAP server 809 in server 262 has added its server contextual information to the SOAP header, SOAP client 801 of container 287 of client machine 286 can now determine that server 266, rather than server 252, actually serviced the request. Particularly, in step 821, SOAP client 801 retrieves the message context from the received SOAP envelope 803a that contained the currency conversion response. In step 823, it queries that message context 810a and determines that server 266 actually serviced the request. In step 825, SOAP client 801 sets the new server location to the address of server 266 for future requests for the currency conversion Web service. Accordingly, when the client machine 284 next generates a Java message, such as illustrated at 827, seeking to use the currency conversion Web service, SOAP client 801 will issue the handle message 829 directly to server 266, rather than to server 252.

In accordance with other aspects of the present invention, a server, upon startup, can self initialize to deploy and implement services from service containers in other servers belonging to the commonly managed group of servers. Merely as an example, when a server that belongs to a server group in accordance with the present invention is brought up, it may request to host copies of the entire list of services that is hosted by a template container. This would essentially be a "clone on startup" option.

Another mechanism for causing clients to start sending requests to a different server that, for instance, just came online is to update a UDDI or similar registry to add the services available at that server. Thereafter, clients that query the UDDI registry will see the additional server providing those services.

An important issue, that is not addressed by the present invention but that would need to be addressed in any practical implementation is security. Particularly, in accordance with the invention, servers and/or clients will be uploading and then running executable software automatically and without human intervention. Some trust mechanism must be provided to prevent hackers from spreading viruses through this mechanism. Potential mechanisms include digital signatures and contractual obligations. Further, in an Intranet and/or with respect to all network nodes within a single firewall, trust between the various nodes may be assumed and no special security measures taken.

In accordance with another aspect of present invention, the containers can be designed to have pluggable capabilities to satisfy certain Web services requests. For example, digital signature processing and other support services for Web services can be distributed essentially exactly as described above with respect to the Web services themselves.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A computer program product recorded on a non-transitory computer readable medium for organizing and manipulating Web services software modules in containers on a network, comprising:

computer executable instructions to determine and describe Web services software modules in containers that are available at a corresponding, local network node, said Web services software modules comprising executable software modules that can be exchanged between nodes of a network and run at said nodes;

computer executable instructions to generate messages to be transmitted to other containers via a network disclosing said Web services software modules that are available at said corresponding network node, and including contextual information about said containers and said Web services available at said corresponding, local node;

computer executable instructions to receive and decipher messages disclosing Web services software modules that are available at other network nodes corresponding to other containers; and computer executable instructions to cause the dynamic reconfiguration of said Web services software modules available at said corresponding network node on said transmitted and said received messages, including the exchange of said Web services software modules between said network nodes, wherein said instructions to cause the dynamic reconfiguration comprise:

computer executable instructions to transmit messages that are hardware and software platform independent to said other containers, requesting said other containers to return copies of Web services software modules;

computer executable instructions, responsive to receipt of messages from said other containers requesting copies of Web services software modules available at said corresponding network node, to send copies of said requested Web services software modules to said requesting containers;

computer executable instructions to receive client requests for use of a Web services software module from client computers via said network;

computer executable instructions that, responsive to receipt of one of said client requests from a client for a Web services software module that is not available at said corresponding network node, determine, based on said received messages disclosing said Web services software modules that are available at other network nodes, whether another network node has a copy of said particular Web services software module; and computer executable instructions that invoke a proxy to another of said containers having a copy of a particular Web services software module based on said determination.

2. The computer program product of claim 1 wherein said computer executable instructions to transmit messages further comprises computer executable instructions to transmit said messages to and from a Web services registry and said computer executable instructions to receive and decipher messages further comprises computer executable instructions to receive said messages from a Web service registry.

3. The computer program product of claim 2 wherein said messages disclosing said Web services software modules that are available at network nodes are in the Web Services Descriptor Language (WSDL).

4. The computer program product of claim 3 wherein said registry is a Universal Description, Discovery, and Integration initiative (UDDI) registry.

5. The computer program product of claim 1 wherein said computer executable instructions to transmit messages uses a peer to peer messaging protocol between said containers and said computer executable instructions to receive and decipher messages uses a peer to peer messaging protocol between containers.

6. The computer program product of claim 5 wherein said messaging protocol is SOAP.

7. The computer program product of claim 6 wherein said disclosures of said Web services software modules that are available at network nodes are contained in headers of Simple Object Access Protocol (SOAP) messages.

8. The computer program product of claim 5 wherein said messaging protocol is JXTA.

9. The computer program product of claim 1 wherein said proxy comprises:

computer executable instructions to route said client requests for a Web services software module that is not available at said corresponding network node and has been determined to be available at another network node to another container corresponding to said another network node;

computer executable instructions to receive responses to said client requests from said another network node; and computer executable instructions to return said responses to said requesting clients.

10. The computer program product of claim 9 further comprising:

computer executable instructions to receive said client requests routed from another of said containers and causing said client requests to be handled by a copy of said particular Web services software module at a network node corresponding to said container to generate said response; and computer executable instructions to transmit said response to said another container that routed said client request to said container.

11. The computer program product of claim 1 further comprising:
computer executable instructions to determine a load of client requests at said corresponding network node; and
wherein said computer executable instructions to cause the dynamic reconfiguration of Web services software modules performs said dynamic reconfiguration based on said load determination.

12. The computer program product of claim 11 wherein said computer executable instructions to cause the dynamic reconfiguration of Web services software modules further comprises:
computer executable instructions that, responsive to determination of a load of client requests for a particular Web services software module that is not available at said corresponding network node exceeding a predetermined level, issues a message requesting a copy of said particular Web services software module from another container that has a copy of said particular Web services software module;
computer executable instructions to receive and locally invoke said particular Web services software module from said other container; and
computer executable instructions to route client requests for said particular Web services software module to said local invocation of said particular Web services software modules.

13. The computer program product of claim 12 wherein said computer executable instructions to cause the dynamic reconfiguration of Web services software modules further comprises:
computer executable instructions to offload said particular Web services software module received from other said container responsive to said load of client requests for said particular Web services software module dropping below a second predetermined level.

14. The computer program product of claim 11 wherein said computer executable instructions to cause the dynamic reconfiguration of Web services software modules comprises:
computer executable instructions that, responsive to determination of a load of client requests for a particular Web services software module available at said corresponding network node exceeding a predetermined level, issues a message requesting another container to accept a copy of the code of said particular Web services software module from said computer program product; and
computer executable instructions to send a copy of said code of said particular Web services software module to said other container responsive to affirmative responses to said message requesting another container to accept a copy of said particular Web services software module from said computer program product.

15. The computer program product of claim 14 wherein said computer executable instructions to cause the dynamic reconfiguration of Web services software modules further comprises:
computer executable instructions to reconfigure said computer program product to route client requests for said particular Web services software module to said other container.

16. The computer program product of claim 15 wherein said other container comprises a plurality of other containers.

17. The computer program product of claim 16 wherein said computer executable instructions to reconfigure said computer program product to route client requests for said particular Web services software module to said other container distributes said client requests for said particular Web services software module between said other containers and said local invocation of said particular Web services software module.

18. The computer program product of claim 1 wherein said client requests indicate whether said requesting client has a container and a platform on which said client is running and wherein said computer program product further comprises computer executable instructions to read said client requests to determine whether said client has a container and said platform.

19. The computer program product of claim 18 wherein said computer executable instructions to cause the dynamic reconfiguration of Web services software modules further comprising:
computer executable instructions to send a copy of the code of a particular Web services software module responsive to a client request for said Web services software module.

20. The computer program product of claim 1 further comprising:
computer executable instructions to monitor usage of Web services software modules by clients; and
computer executable instructions to charge said clients for said usage.

21. The computer program product of claim 1 wherein said contextual information includes at least one of an identity of a Web service, the capabilities of said Web service, the operating system of said Web service, the platform of said Web service, the Web services hosted by a container type Web service, the workload of said Web service, and a network location of said Web service.

22. A method for organizing and manipulating Web services software modules in containers, comprising:
determining and describing Web services software modules in containers that are available at a corresponding network node, said Web services software modules comprising executable software modules that can be exchanged between nodes of a network and run at said nodes;
transmitting messages via a network disclosing said Web services software modules that are available at said corresponding network node to other network nodes via said network and including contextual information about said container and said Web services available at said corresponding, local node;
receiving and deciphering messages from other network nodes disclosing Web services software modules that are available at other network nodes; and
dynamically reconfiguring Web services software modules on said network node transmitted and received based on said messages, including the exchange of said Web services software modules between said network nodes, wherein said instructions for causing the dynamic reconfiguration comprise:
transmitting messages that are hardware and software platform independent to said other containers, requesting said other containers to return copies of Web services software modules;
responsive to receipt of messages from said other containers, requesting copies of Web services software modules available at said corresponding network node, for sending copies of said requested Web services software modules to said requesting containers;
receiving client requests for use of a Web services software module from client computers via said network;
responsive to receipt of a client request from a client for a Web services software module that is not available at said corresponding network node, determining, based on said received messages disclosing said Web services software modules that are available at other network nodes, what network nodes have copies of said particular Web services software module; and invoking a proxy to another of said network nodes having a copy of a particular Web services software module based on said determination.

23. The method of claim 22 wherein transmitting and receiving messages comprises sending and receiving said messages to and from a Web services registry.

24. The method of claim 23 wherein said messages disclosing said Web services software modules that are available at network nodes are in the Web Services Descriptor Language (WSDL).

25. The method of claim 24 wherein said registry is a Universal Description, Discovery, and Integration initiative (UDDI) registry.

26. The method of claim 22 comprising sending and receiving said messages using a peer to peer messaging protocol between said network nodes.

27. The method of claim 26 wherein said messaging protocol is SOAP.

28. The method of claim 27 wherein said disclosures of said Web services software modules that are available at network nodes are contained in headers of Simple Object Access Protocol (SOAP) messages.

29. The method of claim 26 wherein said messaging protocol is JXTA.

30. The method of claim 22 wherein said proxy routes client requests for said particular Web services software module to said other of said network nodes, receives responses to said client requests, and returns said responses to said requesting clients.

31. The method of claim 30 further comprising:
receiving said client requests forwarded from other of said network nodes and causing said client requests to be handled by said copy of said particular Web services software module corresponding to said network node to generate said response; and
transmitting said response to said network node that issued said client request.

32. The method of claim 22 further comprising:
determining a load of client requests at said corresponding network node; and
wherein said dynamic reconfiguration is performed based on said load determination.

33. The method of claim 32 wherein dynamically reconfiguring further comprises:
responsive to determination of a load of client requests for a particular Web services software module that is not available at said corresponding network node exceeding a predetermined level, issuing a message requesting a copy of the code of said particular Web services software module from another network node that has a copy of said particular Web services software module;
receiving and locally invoking said code for said particular Web services software module from said other network node; and
routing client requests for said particular Web services software module to said local invocation of said code for said particular Web services software module.

34. The method of claim 33 wherein dynamically reconfiguring further comprises:
offloading said local code for said particular Web services software module responsive to said load of client requests for said particular Web services software module dropping below a second predetermined level.

35. The method of claim 32 wherein dynamically reconfiguring comprises:
responsive to determination of a load of client requests for a particular Web services software module available at said corresponding network node exceeding a predetermined level, issuing a message requesting another network node to accept a copy of the code of said particular Web services software module from said network node; and
sending a copy of said code of said particular Web services software module to said other network node responsive to affirmative responses to said message requesting another network node to accept a copy of the code of said particular Web services software module from said network node.

36. The method of claim 35 wherein dynamically reconfiguring further comprises:
reconfiguring said network node to route client requests for said particular Web services software module to said other network node.

37. The method of claim 36 wherein said other network node comprises a plurality of other network nodes.

38. The method of claim 37 wherein reconfiguring said network node comprises distributing said client requests for said particular Web services software module between said other network nodes and said local invocation of said particular Web services software module.

39. The method of claim 22 wherein said client requests indicate a platform on which said client is running and wherein said method further comprises:
reading said client requests to determine said platform of said client.

40. The method of claim 39 further comprising:
sending a copy of the code of a particular Web services software module responsive to a client request for said Web services software module.

41. The method of claim 22 further comprising:
monitoring usage of Web services software modules by clients; and
charging said clients for said usage.

* * * * *